(12) United States Patent
Gupta et al.

(10) Patent No.: US 7,689,635 B2
(45) Date of Patent: Mar. 30, 2010

(54) AREA EFFICIENT SHIFT / ROTATE SYSTEM

(75) Inventors: Shalini Gupta, Delhi (IN); Sumanta Sarkar, Noida (IN)

(73) Assignee: STMicroelectronics Pvt. Ltd., Greater Noida (IN)

( * ) Notice: Subject to any disclaimer, the term of this patent is extended or adjusted under 35 U.S.C. 154(b) by 1064 days.

(21) Appl. No.: 11/260,863

(22) Filed: Oct. 27, 2005

(65) Prior Publication Data

US 2006/0248134 A1    Nov. 2, 2006

(30) Foreign Application Priority Data

Oct. 28, 2004  (IN)  .................. 2131/DEL/2004

(51) Int. Cl.
*G06F 7/00* (2006.01)
(52) U.S. Cl. ..................................... 708/209
(58) Field of Classification Search .................. 708/209; 377/69

See application file for complete search history.

(56) References Cited

U.S. PATENT DOCUMENTS

| 4,829,460 A * | 5/1989 | Ito ............................ 708/209 |
| 5,262,971 A * | 11/1993 | Yamaguchi ................. 708/209 |
| 5,844,825 A * | 12/1998 | Wang et al. ................ 708/209 |
| 5,978,822 A * | 11/1999 | Muwafi et al. ............. 708/209 |
| 6,304,956 B1 | 10/2001 | Tran |

* cited by examiner

*Primary Examiner*—Chuong D Ngo
(74) *Attorney, Agent, or Firm*—Lisa K. Jorgenson; William R. McClellan; Wolf, Greenfield & Sacks, P.C.

(57) ABSTRACT

An area efficient data shifter/rotator using a barrel shifter. The invention is a circuit, which uses a single barrel shifter and is controllable to implement either a left or right shift or rotation of bits of a digital data word. The circuit is dynamically controllable to implement left or right shift of bits of the digital data word (both logical and arithmetic) and rotation (to the left or right) of bits of the word. The proposed circuit produces the required output in a single cycle.

9 Claims, 2 Drawing Sheets

AREA EFFICIENT SHIFT / ROTATE SYSTEM

FIELD OF THE INVENTION

The invention relates to an area efficient data shifter/rotator using a barrel shifter.

BACKGROUND OF THE INVENTION

Data bit shifting and rotation are common operations by which bits of a data word are shifted into lower order bit positions (shift right) or into higher order bit positions (shift left). On an integrated circuit, real estate is generally a scarce commodity as more and more functions are to be provided within a limited area. Therefore, it is desirable to have a universal shifter unit capable of handling both the shift and rotate operations, which can be implemented in an efficient manner that reduces the number of logic required.

Conventional circuits for performing left and right shifting of bits (the bits comprising a data word) and rotation have been implemented. However, such shifting circuits include two separate circuit branches: one for shifting the bits to the left; the other for shifting the bits to the right.

U.S. Pat. No. 6,304,956 entitled 'Using two barrel shifters to implement shift, rotate, rotate with carry, and shift double as specified by the X86 architecture' discloses a shifter unit having three major portions: a right shifter, a left shifter and control logic. For shifting operations, only one of the two shifters is used, while rotation functions require both left and right shifters.

The results of the two shifters are then provided to a merging logic for logic operations. Depending on the instruction type, the merging logic performs different logic operations on the two results. For example, in some instructions (rotation), the two results are ORed together. In some other instructions (shifting), only one result is needed from one of the two shifters, and the result of the other shifter is ignored. The merging logic outputs the desired results as an output.

For rotation, both of the two shifters are provided with the source operand. Then, the first shifter shifts the source operand by a first number, where the first number is the count operand as defined in the instruction. The second shifter shifts the source operand by a second number, where the first number in addition with the second number is equal to the number of bits of the source operand. Due to the two branches, each using a barrel shifter, the area consumed by this technique is very large.

The U.S. Pat. No. 5,978,822 entitled "Circuit for rotating, left shifting, or right shifting bits" uses a single branch of a shifter unit which is capable of performing shifting and rotation operations. The circuit includes a set of series connected multiplexer stages, and circuitry for selectively inverting the order of the bits of the word input to and the word output from the set of multiplexer stages. Each of the multiplexer stages shifts the bits of the word it receives either by zero places (in response to a first condition of a control signal), or by a positive number of places (in response to a second condition of the control signal).

To execute a left shift, the circuitry for selectively inverting the input to the multiplexer stages does not invert the order of the bits of the input word. To execute a right shift, the circuitry for selectively inverting the input to the multiplexer stages inverts the order of the bits of the input word.

To enable the circuit to perform rotations (by a selectable number of bits to the left or right) of bits of the input word, a first one of the multiplexer stages includes bit selection circuitry for asserting appropriate bits needed for executing any such rotation to multiplexing circuitry in that multiplexer stage.

But for a circuit of input digital data word containing $2^n$ bits, shifting can be done from 0 to n−1 places, while rotation can be done only up to (n/2)−1 places. Thus it can rotate the input bits up to some places only of an input word (by two or more bits to the left or right) during a single cycle, by duplicating the input word to form an extended word, shifting bits of the extended word, and selecting a subset of the shifted bits of the extended word.

U.S. Pat. No. 5,844,825 entitled "Bidirectional Shifter Circuit" comprises one shifter unit and two bit reversing circuits: one at the input of the shifter unit and one at the output of the shifter unit. This technique can handle two operations and these two operations are based on the shifter unit, left or right. Further it can handle left rotation and right rotation.

In this technique, the bidirectional shifter has 3 components: a first bit reversing circuit, a single direction shifter circuit and a second bit reversing circuit. The first bit reversing circuit receives an input data word. In response to choosing a first shift direction, the first bit reversing circuit outputs the data word with the bits in their original order. In response to choosing the second shift direction, the first bit-reversing circuit outputs the data word with the bits in reverse order. A single-direction shifter circuit is provided which receives the data word outputted by the first bit-reversing circuit and shifts the received data word the chosen number of bit positions in the first direction. A second bit-reversing circuit is provided which receives the shifted data word and which, in response to choosing the first shift direction, outputs the data word with the bits in the same order as received and, in response to choosing the second shift direction, outputs the data word with the bits in reverse order.

If the shifter unit is a left cyclic shifter, then the circuit can handle only left and right cyclic shifting i.e. ROL and ROR. This technique can handle only two types of the operation based on the shifter unit. Thus said circuit does not do all the expected operations.

OBJECT & SUMMARY OF THE INVENTION

It is an object of the present invention to obviate above and other drawbacks from the existing arts to provide an area efficient data shifter/rotator that can rotate entire input bits and is capable of doing expected operations.

Another object of the present invention is to produce the output for all operations in a single cycle.

To achieve the aforesaid and other objects the instant invention provides an area efficient shift/rotate system, comprising:

a series arrangement of multiplexer stages each stage having a plurality of multiplexer equal to the number of inputs bits;

an input reversal circuit receiving the inputs bits;

an additional circuitry at the input to each stage of said series arrangement;

an output reversal circuit connected to the output of the last stage of said series arrangement, and a right arithmetic control logic having its output connected to input of each stage of the additional circuitry.

For each stage, said additional circuitry has $2^{m-1}$ multiplexers where m is stage number, m=1, 2, 3 . . . n for $2^n$ input data word.

In one embodiment, said input reversal circuit comprises multiplexers.

In one embodiment, said output reversal circuit comprises multiplexers.

n one embodiment, said right arithmetic control logic comprises:
   a logic gate receiving two inputs; and a multiplexer having its select line connected to the output of said logic gate for selecting either most significant bit of input data word or zero.

In one embodiment, said logic gate is an AND gate.

BRIEF DESCRIPTION OF THE DRAWINGS

The invention will now be described with reference to the accompanying drawings.

DETAILED DESCRIPTION

The present invention can perform the following six operations using one barrel shifter:
   Shift arithmetic left (SAL)
   Shift logic left (SHL)
   Shift Arithmetic Right (SAR)
   Shift Logic Right (SHR)
   Left Rotation (ROL)
   Right Rotation (ROR)

For performing the above 6 operations, it uses three control signals in following manner:

TABLE 1

| Right (R) | Rotate (ROT) | Arithmetic (A) | Operation |
| --- | --- | --- | --- |
| 1 | 0 | 0 | Shift Logical Right (SHR) |
| 1 | 0 | 1 | Shift Arithmetic Right (SAR) |
| 1 | 1 | X | Rotate Right (ROR) |
| 0 | 0 | 0 | Shift Logical Left (SHL) |
| 0 | 0 | 1 | Shift Arithmetic Left (SAL) |
| 0 | 1 | X | Rotate Left (ROL) |

Shift Control Signals

Shift Arithmetic Left (SAL) and Shift Logical Left (SHL) instructions perform the same operation; they shift the bits to the left (toward more significant bit locations). For each shift count, the least significant bit is cleared.

The Shift Arithmetic Right (SAR) and Shift Logical Right (SHR) instruction shifts the bits to the right (toward less significant bit locations). For each shift count, the SHR instruction clears the most significant bit; the SAR instruction sets or clears the most significant bit to correspond to the sign (most significant bit) of the input word.

For each shift count, rotate left (ROL) instruction shifts all the bits toward more-significant bit positions, except for the most significant bit, which is rotated to the least significant bit location. For each shift count, rotate right (ROR) instruction shifts all the bits towards less significant positions, except for the least significant bit, which is rotated to the most significant bit location.

Figure 1:
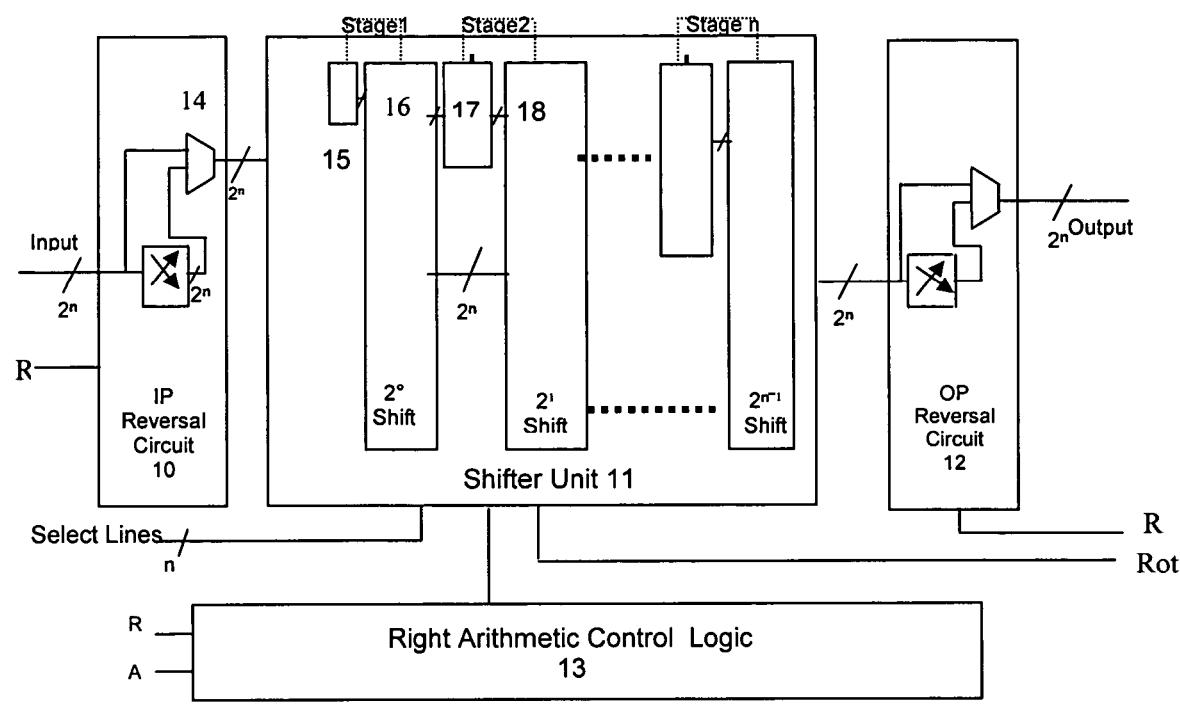
FIG. 1 is a block diagram showing the $2^n$ bit shifter circuit.

FIG. 1 has four major components: IP reversal circuit 10, shifter unit 11, OP reversal circuit 12 and right arithmetic control logic 13.

A digital data word having $2^n$ bits is the input to the IP reversal circuit 10. For $2^n$-bit shifter circuit, IP reversal circuit 10 has $2^n$ 2:1 multiplexers. These multiplexers invert the data word if it is right shift or right rotation operation. For left shift or left rotation operation, IP multiplexers do not invert data words. Invert data word means inversion of the order of the bits of original data word. The most significant bit of the original data word becomes the least significant bit of the inverted data word. In general, for n bit data word, kth bit of the non-inverted word will be (n−k−1) th bit of the inverted data word.

Ip reversal circuit 10 sends non-inverted digital data word to the shifter unit 11, if it is left shift or left rotation and sends inverted digital data word to the shifter unit 11 if operation is right shift or right rotation.

Shifter unit 11 performs the shifting/rotating operation on the inverted or non-inverted input digital data word based on the operation required.

For $2^n$ bit shifter circuit, shifter unit 11 contains n stages. Each stage has one shifting stage 16, 18 and the like and an additional circuitry 15, 17 and the like. Additional circuitry selects data based on whether it is shift operation or rotation operation. Output of additional circuitry goes to the input of corresponding shift stage. Output of IP reversal circuit 10 goes to the first stage of shifter unit 11.

Additional circuitry 15 for stage 1 contains one 2:1 multiplexer, for stage 2 contains two 2:1 identical multiplexers, in general, for stage n, additional circuitry contains $2^{n-1}$ 2:1 identical multiplexers.

Each shifter stage, 1 to n, contains $2^n$ 2:1 identical multiplexers for shifting the bits of word it receives or does not shift the input word, based on the selection line. stage 1 either shifts the bits by one place or does not shift the bits, depending on the value of the selection line bit [0]. Stage 2 either shifts the bits by two places or does not shift the bits, depending on the value of the selection line bit [1]. And Stage n either shifts the bits by $2^{n-1}$ places or does not shift the bits, depending on the value of selection line bit [n−1]. Output of shift stage k goes to the input of the stage k+1.

Output of last shift stage goes to the OP reversal circuit 12.

Shifter unit 11 gives the shifted/rotated output of the input digital data word (inverted or non inverted) and this output goes to the OP reversal circuit 12. The OP reversal circuit 12 contains $2^n$ 2:1 identical multiplexers, which invert the output of the shifter unit 11 if it is right shift or right rotation operation and the inverted output is thus the final output for desired operation. If the operation is left shift or left rotation, output reversal circuit 12 does not invert the output of the shifter unit 11 and gives non-inverted output of the shifter unit 11 as the final output.

Right Arithmetic Control logic unit 13 comprises one logic gate and one Multiplexer M. This logic gate is an AND gate with input as Right (R) and Arithmetic (A) that are used to generate a right arithmetic signal. Output of this AND gate is connected to the selection line of multiplexer M. Multiplexer M selects either the most significant bit of input data word or zero based on whether it is right arithmetic shift operation or not.

Figure 2:
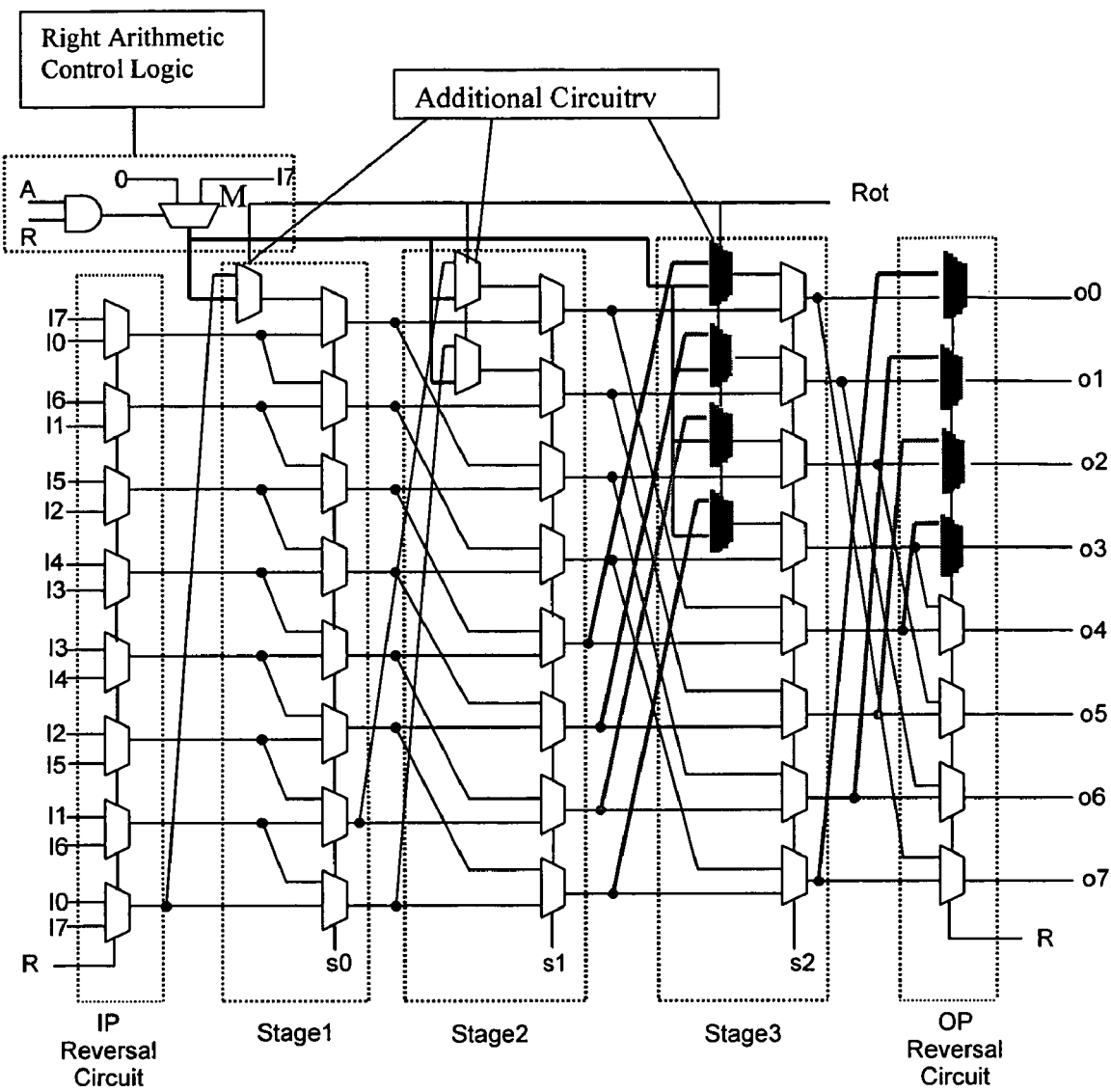
FIG. 2 shows a detailed layout of the 8 bit shifter unit.

In FIG. 2, data inputs are from 10 to 17, 10 is the least significant bit of input digital data word and 17 is the most significant bit. S0 to S2 are the selection lines, S0 is the least significant bit and S2 is the most significant bit of the selection line. For all 2:1 multiplexers, the lower data input line is for selection line value 0 and upper data line is for selection line value 1.

Table 2 below is a comparative analysis of the logic required by present invention and U.S. Pat. No. 6,304,956.

TABLE 2

| S. No | Data Size | Logic required by proposed technique | Logic required by U.S. Pat. No. 6,304,956 |
|---|---|---|---|
| 1 | 8 | 47 Mux | 64 Mux + 8 OR gates |
| 2 | 16 | 111 Mux | 160 Mux + 16 OR gates |
| 3 | 32 | 255 Mux | 384 Mux + 32 OR gates |
| 4 | 64 | 575 Mux | 896 Mux + 64 OR gates |
| 5 | 128 | 1279 Mux | 2048 Mux + 128 OR gates |
| 6 | 256 | 2815 Mux | 4608 Mux + 256 OR gates |

In table [2], all multiplexers are 2:1 and OR gates are having 2 inputs.

If the proposed shifter circuit and shifter by U.S. Pat. No. 6,304,956 is implemented in 4 Input LUT (Look up table) based FPGA (LUT can give only one Output), following table compares the number of LUTs required by these two techniques:

TABLE 3

| S. No | Data Size | No of LUTs required by proposed technique | No of LUTs required by U.S. Pat. No. 6,304,956 |
|---|---|---|---|
| 1 | 8 | 47 | 72 |
| 2 | 16 | 111 | 176 |
| 3 | 32 | 255 | 416 |
| 4 | 64 | 575 | 960 |
| 5 | 128 | 1279 | 2176 |
| 6 | 256 | 2815 | 4864 |
| | Total | 5082 | 8664 |

Table [2] and [3] do not take into consideration logic/LUT required to generate control signals. The proposed technique requires only one two input AND gate and one 2:1 multiplexer or one LUT to generate right Arithmetic control logic.

Reduction in LUTs count with respect to U.S. Pat. No. 6,304,956 is 41.34%.

Thus operations, where only shift and rotate without carry are required, the present invention saves considerable area compared to the U.S. Pat. No. 6,304,956.

The following are some of the products/design where it would be advantageous to use the inventive shifter circuit, since, the inventive shifter circuit provides an area-optimized solution.

1) Microprocessor

The present invention can be used in a microprocessor and more particularly, to the design of shifter units used in a microprocessor.

Data bit shifting is a common operation in a microprocessor design and a shifter unit is required to handle both the data word shifting and rotating functions. For example, in the Intel x86 instruction set, there are two groups of instructions (i.e. shift group, and rotate group instructions) that require either shifting or rotating function. The inventive dynamic shifter circuit can be used in the shifter unit of microprocessor, since it requires less area as compared to the conventional methods.

2) DSP

A conventional DSP includes data memory, a Program Memory, a Program Control Unit (PCU), a Memory Management Unit (MMU), an Arithmetic Computational Unit (ACU), and an Input/Output Unit (IOU).

The ACU preferably includes two Multiply and Accumulate (MAC) units that operate in parallel (in response to control bits from PCU), and an arithmetic manipulation unit (AMU) which operates in parallel with the MAC units (in response to control bits from PCU).

The proposed shift circuit is preferably included within the AMU.

Since a conventional AMU was using 2 separate circuit branches, the area consumed by a conventional circuit is larger, while the inventive circuit uses only one branch for all shifting/rotation operations, the area required by the inventive circuit is significantly less as compared to the conventional shifter circuit. In addition, the inventive shifter circuit is able to shift or rotate any number of bits in one cycle. To add more, the inventive shifter circuit can perform Arithmetic Left and Right Shift also in the same circuit.

3) Suppose a user wants to implement a design where the user selects one of the six operations (listed in Table 1) at a time based on the same control variable value.

A pseudo code implementation of this design is as follows:
Case (sel)
3'b000: a=a SHL b //Do Shift Logical Left Operation
3'b001: a=a SAL b //Do Shift Arithmetic Left Operation
3'b01x: a=a ROL b //Do Rotate Left Operation
3'b100: a=a SHR b //Do Shift Logical Right Operation
3'b101: a=a SAR b //Do Shift Arithmetic Right Operation
3'11x: a=a ROR b //Do Rotate Right Operation endcase;

The above design performs the shift or rotate operation based on the sel value.

The above design at a time requires only ONE shift/rotate operation to be performed based on the sel value.

Conventional Method:

If we have to implement above design in a circuit, conventionally, it would require following components:
1) Multiplexer to select the appropriate Shift/Rotate operation based on sel value.
2) Logical Left Shift Circuit
3) Arithmetic Left Shift Circuit
4) Rotate Left Circuit
5) Logical Right Shift Circuit
6) Arithmetic Right Shift Circuit
7) Rotate Right Circuit The Inventive Method:

If we use the inventive dynamic shifter, the following components would be required:
1) A Multiplexer to select the appropriate Shift/Rotate operation based on sel value
2) A Dynamic Shifter Circuit, where sel bits would drive Right (R), Rotate (ROT), and Arithmetic (A) bits of Dynamic Shifter.

If the logic required by the conventional method and logic required by the inventive method is compared, it is quite obvious that the inventive method takes much less chip area as compared to the conventional method because the conventional circuit requires six separate circuits for performing shift/rotate operations while all these six shift/rotate operations can be performed in a single circuit in the inventive method.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not intended as limiting. The invention is limited only as defined in the following claims and the equivalents thereto.

What is claimed is:

1. An area efficient shift/rotate system, comprising:
   a series arrangement of shifter stages connected in series, each shifter stage having a plurality of multiplexers equal to the number of inputs bits and additional circuitry at the input to each shifter stage, wherein, for each shifter stage of the series arrangement, said additional circuitry has $2^{m-1}$ multiplexers, where m is the stage number of said series arrangement;
   an input reversal circuit receiving the inputs bits and providing outputs to a first shifter stage of the series arrangement;
   an output reversal circuit connected to the output of a last shifter stage of said series arrangement, and
   a right arithmetic control logic having its output connected to inputs of the additional circuit of each of the shifter stages.

2. The area efficient shift/rotate system as claimed in claim 1, wherein said input reversal circuit comprises multiplexers connected in parallel.

3. The area efficient shift/rotate system as claimed in claim 1, wherein said output reversal circuit comprises multiplexers connected in parallel.

4. The area efficient shift/rotate system as claimed in claim 1, wherein said right arithmetic control logic comprises:
   a logic gate receiving two inputs; and
   a multiplexer having its select line connected to the output of said logic gate for selecting either the most significant bit of the input bits or zero.

5. The area efficient shift/rotate system as claimed in claim 4, wherein said logic gate is an AND gate.

6. A shift/rotate system, comprising:
   a shifter unit including shifter stages connected in series, each shifter stage including a plurality of multiplexers equal to the number of input bits and additional circuitry connected to inputs of the multiplexers in respective shifter stages, the additional circuitry for each shifter stage including $2^{m-1}$ multiplexers, where m is a stage number of the shifter stage;
   an input reversal circuit receiving the input bits and selectively providing, in response to a control signal, the input bits or reversed input bits to a first shifter stage of the shifter unit;
   an output reversal circuit receiving output bits of a last shifter stage of the shifter unit and selectively providing, in response to the control signal, the output bits or reversed output bits as an output of the shift/rotate system; and
   right arithmetic control logic having its output connected to inputs of the additional circuitry of each of the shifter stages.

7. A shift/rotate system as defined in claim 6, wherein the input reversal circuit includes n multiplexers connected in parallel, where n is equal to the number of input bits.

8. A shift/rotate system as defined in claim 6, wherein the output reversal circuit includes n multiplexers connected in parallel, where n is equal to the number of input bits.

9. A shift/rotate system as defined in claim 6, wherein the right arithmetic control logic comprises a logic gate receiving two control inputs, and a multiplexer having its select line connected to the output of the logic gate for selecting either the most significant bit of the input bits or zero.

* * * * *

UNITED STATES PATENT AND TRADEMARK OFFICE
CERTIFICATE OF CORRECTION

PATENT NO. : 7,689,635 B2 Page 1 of 1
APPLICATION NO. : 11/260863
DATED : March 30, 2010
INVENTOR(S) : Shalini Gupta et al.

It is certified that error appears in the above-identified patent and that said Letters Patent is hereby corrected as shown below:

Col. 7, line 18 should read:
to inputs of the additional circuitry of each of the shifter Signed and Sealed this Fourth Day of May, 2010

David J. Kappos
*Director of the United States Patent and Trademark Office*